Figure 1:
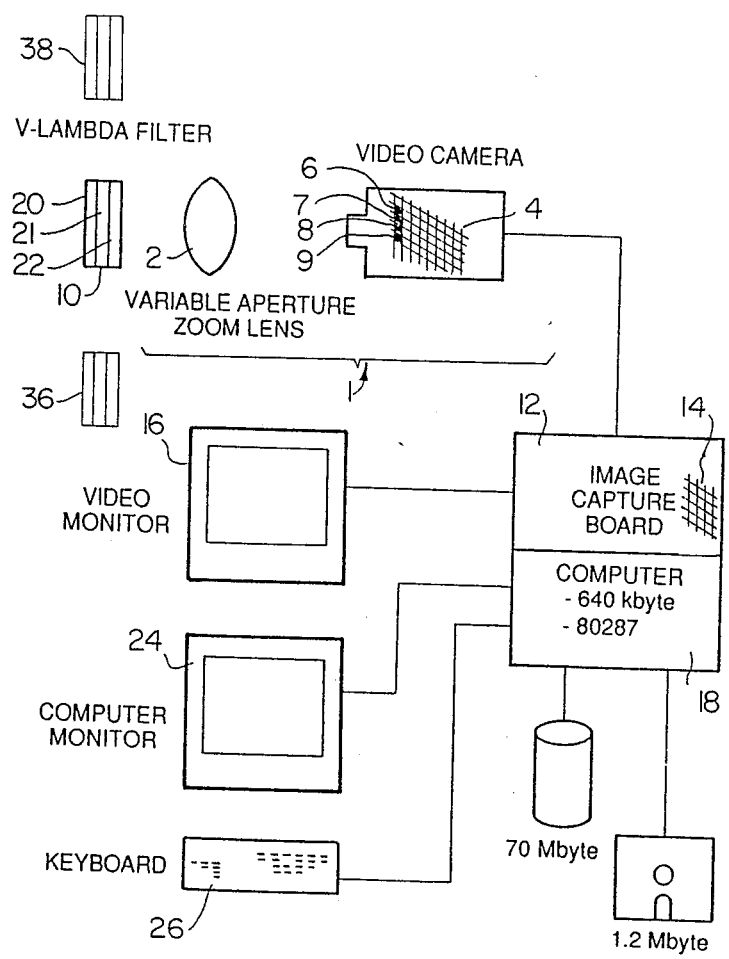

United States Patent [19]

Rea

[11] Patent Number: 4,962,425
[45] Date of Patent: Oct. 9, 1990

[54] PHOTOMETRIC DEVICE

[75] Inventor: Mark S. Rea, Orleans, Canada

[73] Assignee: National Research Council of Canada/Conseil National deResherches Canada, Ottawa, Canada

[21] Appl. No.: 263,023

[22] Filed: Oct. 27, 1988

[51] Int. Cl.$^5$ .............................................. H04N 17/00
[52] U.S. Cl. ..................................... 358/139; 358/163; 358/168; 358/169; 358/903
[58] Field of Search ................ 358/139, 163, 168, 169, 358/903

[56] References Cited

U.S. PATENT DOCUMENTS 4,862,265 8/1989 Bartow ................................. 358/139

Primary Examiner—Howard W. Britton
Attorney, Agent, or Firm—Francis W. Lemon

[57] ABSTRACT

The equipment and calibration of a luminance and image analysis device is provided for acquiring and interpreting calibrated images. The device is comprised of a solid state video camera with V-lambda (photopic) correction filter for acquiring light (luminance) and spatial information from a scene and a personal computer with image capture board for storing and analyzing these data. From the acquired spatial-luminance information the software may, for example, predict Relative Visual Performance, or RVP. Essentially, the RVP is computed on the basis of three stimulus variables contained in a captured image; the age dependent adaptation luminance and apparent contrast of the target against its background, and the apparent size of the target. The device is not limited to assessments of RVP, but can acquire and process images according to any set of algorithms where light (luminance) and size information is required. The device is capable of providing information for almost every vision algorithm. The two essential functions of the device, are image acquisition and image processing.

5 Claims, 8 Drawing Sheets

PHOTOMETRIC DEVICE

This invention relates to a photometric device.

Lighting and the spectral sensitivity thereto of life forms are closely linked, for example, lighting and human vision are closely linked. Interior rooms and exterior roadways are illuminated for discernment. Surprisingly however, this link between lighting and vision is technically weak. The ability to relate visual responses to a given lighting condition suffers on two counts. First, the scientific understanding of visual response is rudimentary, although perhaps functional for some applications. Human visual processing is more complex than any computational model available. For example, it cannot be explained how a mother's face can be recognized from different perspectives and under different lighting geometries or spectral compositions. However, simple responses can be predicted fairly accurately (reaction times or magnitude estimations) to visual stimuli of different contrast or size. Thus, for some practical applications, how these responses will be improved or degraded under different illumination levels or lighting geometries can be predicted once we can specify the stimulus conditions.

A second limitation is an inability to easily specify the visual stimulus. Therefore, even with a satisfactory model of vision, visual responses to realistic materials cannot be predicted because current technology seriously restricts the ability to accurately specify the visual stimulus. Many hours are required to acquire the information necessary to describe, for example, the visibility of even a single letter. It is not trivial to specify its luminance, its size or indirect techniques are required to make even these measurements, see, for example, Rea, M. S., Ouellette, M. J., and Pasini, I., Contrast measurements in the laboratory and the field, Proceedings of the 21st Session of the Commission International de l'Eclairage, Venice, 1987.

This technical limitation has impeded progress in lighting. Indeed, there has been little reason to extend the understanding of the links between lighting and vision because there have been no technical means of acquiring the information necessary to make this link. Importantly too, the tools have not been readily available for processing information according to a visual performance model.

There is a need for an image acquisition and an image processing device whereby a relationship between lighting and spectral sensitivity thereto of life forms (e.g. humans and plants) is obtainable.

According to the present invention there is provided a photometric device, comprising;

(a) a video camera having a pixel sensor array and known pixel value output signals, relative to a black reference zero light value storage element in the sensor array, in response to the spatial - light intensity information being viewed by the camera, the camera having a low geometric distortion, (b) filter means on the variable aperture lens for, in operation, transforming the camera spectral sensitivity to match a known spectral sensitivity, (c) an image acquisition board connected to the output from the camera and having a spatial resolution closely related to that of the camera, the board having a dc restoration circuit for correcting any drift in the camera output signal, a pixel value programmable gain and offset amplifier, and means for storing the pixel values in digital form in a frame memory spatial array, (d) a video target viewer connected to the camera, and (e) means connected to the output of the image acquisition board for computing visual angle, and scaling the pixel output signals for computing contrast from the absolute value in relation to a predetermined light intensity received by the camera, and providing a substantially constant and linear relationship capability between the input luminance and pixel value output signals over substantially the entire pixel sensor array and the light range of operation.

The video camera may have a variable aperture lens and the predetermined light intensity received by the camera may be determined by the setting of the variable aperture lens.

The filter means may be a V-lambda' filter for, in operation, producing a photopic response by the device.

The filter means may be a V-lambda' filter for, in operation, producing a scotopic response by the device.

The filter means may be one of a plurality of different filter means which are used sequentially to filter different wavelengths, and the means connected to the output of the image acquisition board may, in operation, deduce colour information from the filtered wavelengths In this specification light intensity means the level of electromagnetic flux received by an object.

The spectral sensitivity (responsivity) of the object may be modelled through filters and the inherent spectral sensitivity of the detector so that the intensity of light on that object can be correctly measured. The object may, for example, be animal (human), vegetable (plants and trees) or mineral (artifacts).

Figure 2:
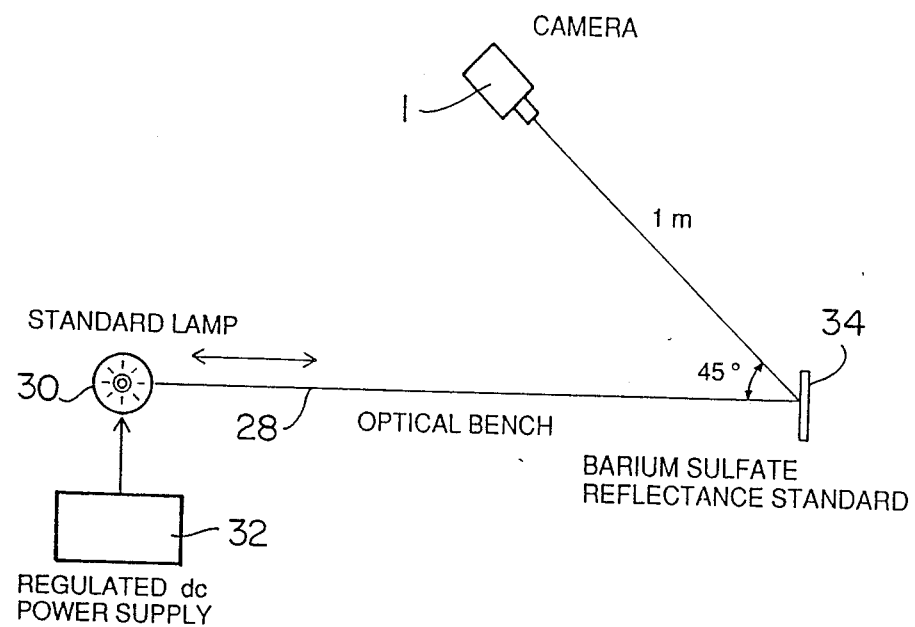
Figure 3:
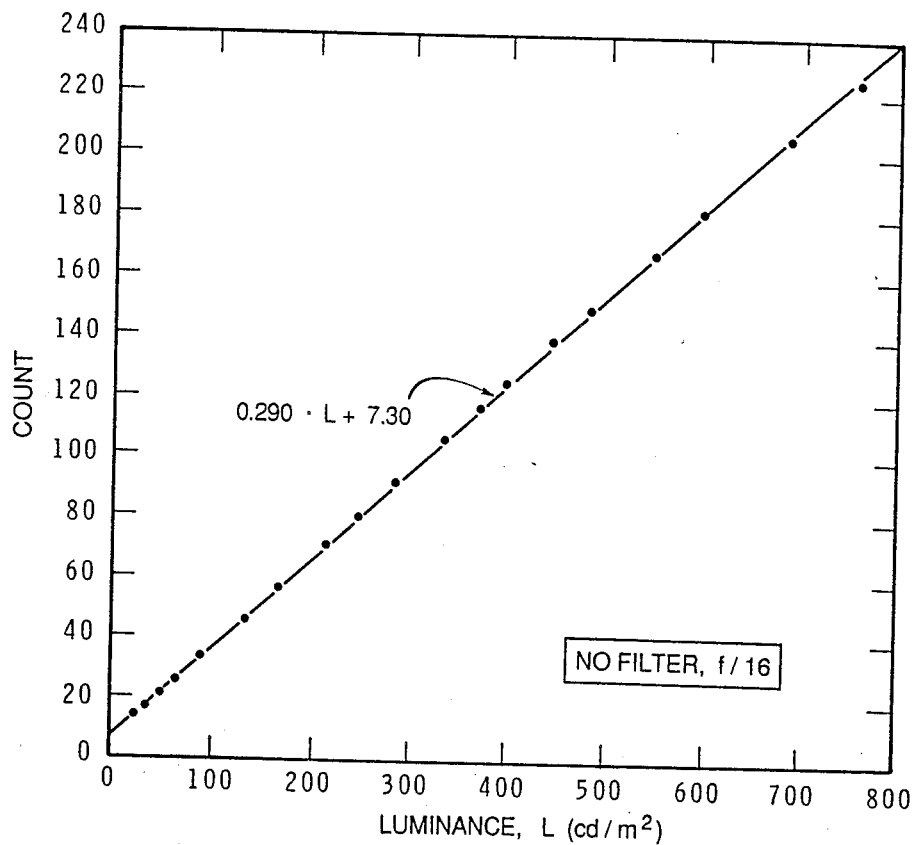
Figure 4:
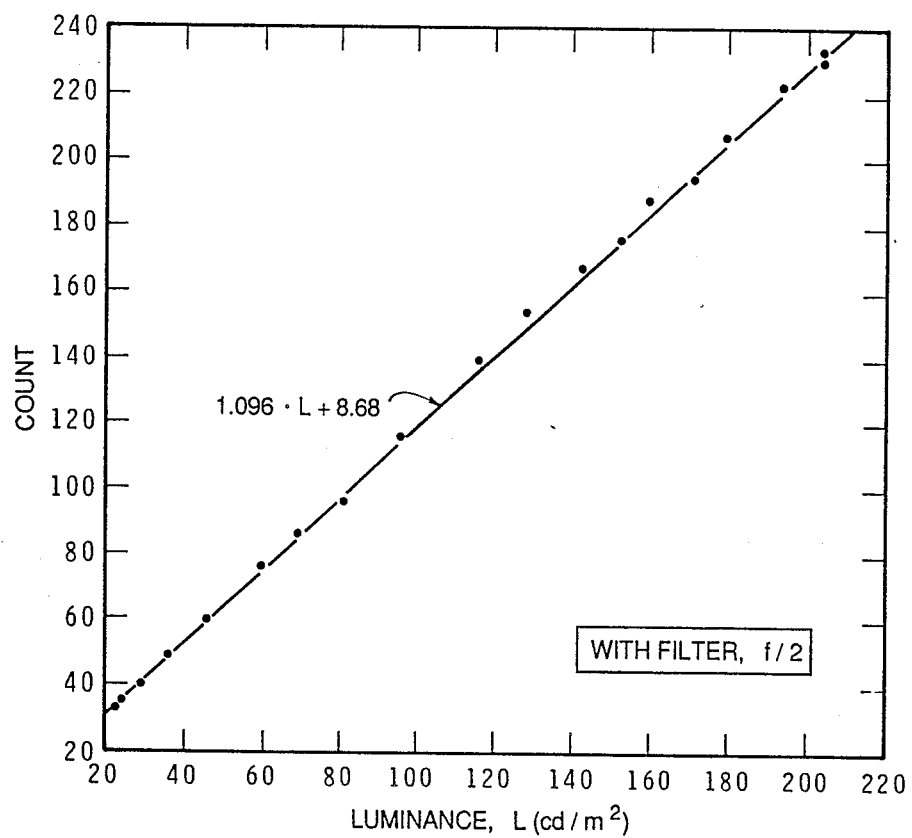
Figure 5:
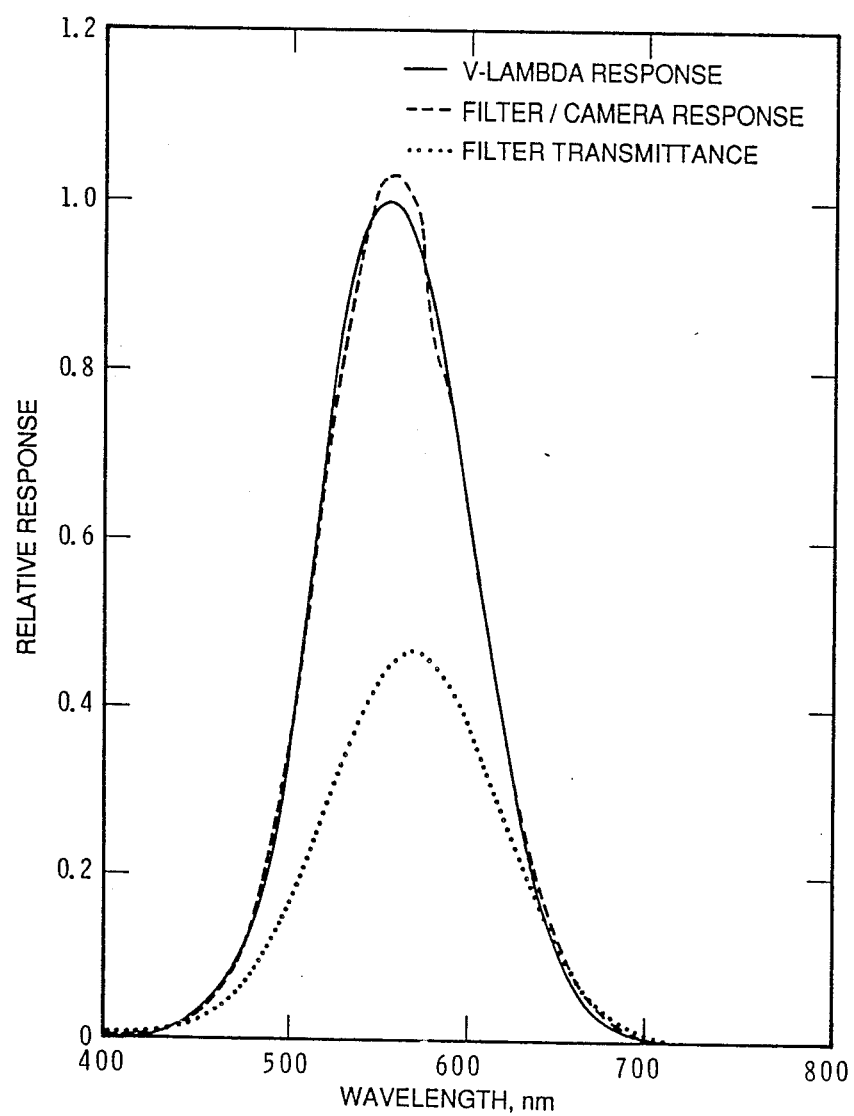
Figure 6:
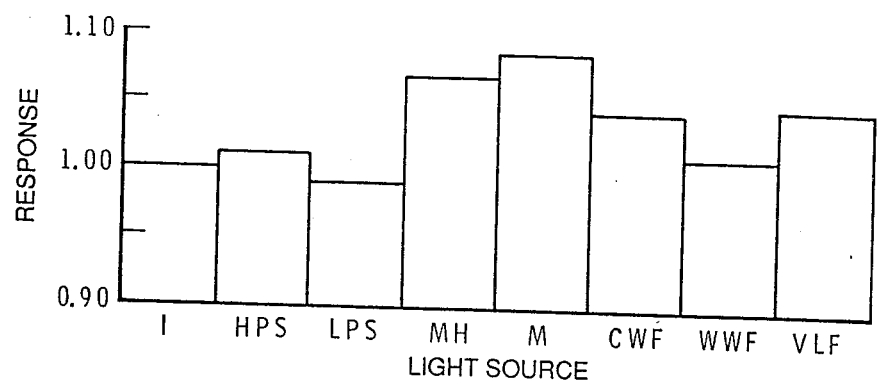
Figure 7:
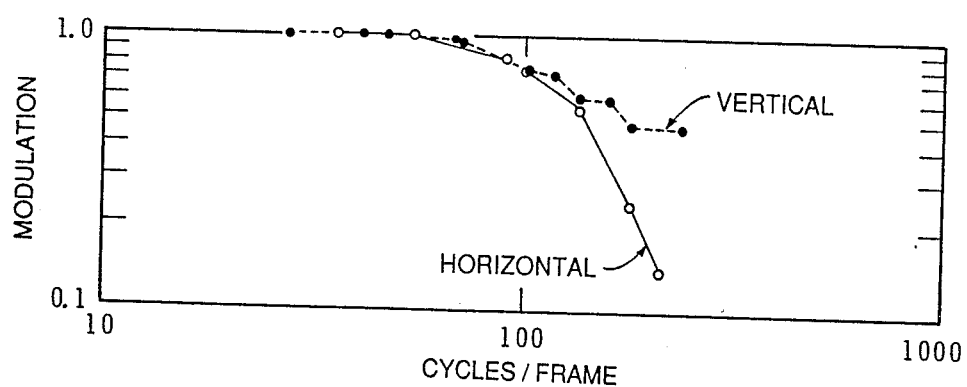
Figure 8:
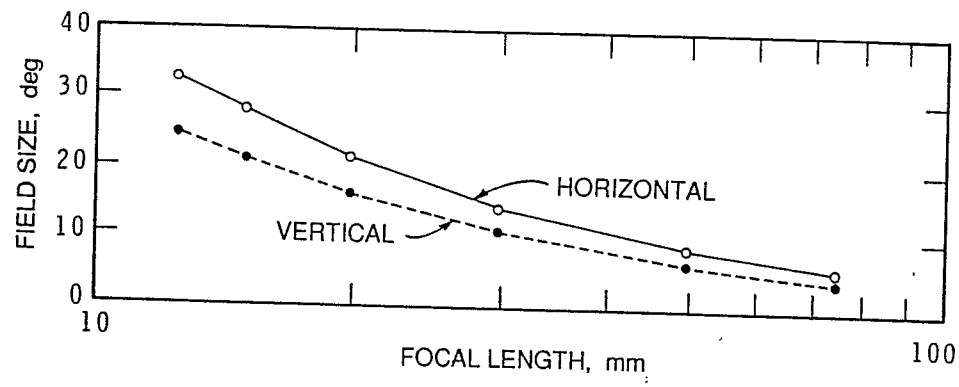

In the accompanying drawings which illustrate by way of example, an embodiment of the present invention;

FIG. 1 is a diagramatic view of a photometric device,

FIG. 2 is a diagramatic view of the device shown in FIG. 1 being used in tests to verify the present invention, FIG. 3 is a graph of the linearity response plotted as the response value against luminance, for the device shown in FIG. 1 with the camera aperture at f/16 and without using a luminance correction filter, FIG. 4 is a similar graph to that of FIG. 3 but with the camera aperture at f/2 and with the luminance filter attached FIG. 5 is a graph of the spectral sensitivity of the device shown in FIG. 1 shown as relative distribution plotted against wavelength, with the luminance filter attached, FIG. 6 is a graph of the relative luminance response, of the device, shown in FIG. 1, relative to another commercially available photometric device, and plotted as a ratio against light source, FIG. 7 is a graph of the modulation transfer function in horizontal and vertical directions, plotted as modulation against the cycles/frame, for the device shown in FIG. 1, and FIG. 8 is a graph of the camera field size in the horizontal and vertical directions, in degrees of the device shown in FIG. 1, plotted as a function of the focal length of the camera lens.

In FIG. 1 there is shown a photometric device, comprising;

(a) a video camera generally designated 1 having, in this embodiment, a variable aperture lens 2, a pixel sensor array, a portion of which is shown and designated 4, and known pixel value output signals, relative to a black reference zero light value storage elements, four of which are shown and designated 6 to 9, in the sensor array 4, in response to spatial - light intensity information being viewed by the camera 1, the camera 1 having a low geometric distortion, (b) filter means 10 on the variable aperture lens 2 for, in operation, transforming the camera spectral sensitivity to match a known spectral sensitivity, c) an image acquisition board, generally designated 12, connected to the output from the camera 1 and having a spatial resolution closely related to that of the camera 1, the board 12 having a dc restoration circuit for correcting any drift in the camera output signal, a pixel value programable gain and offset amplifier, and means for storing the pixel values in digital form in a frame memory spatial array, a portion of which is shown and designated 14, (d) a video target viewer 16 connected to the camera, and (e) means, in the form of a programmed computer 18, connected to the output of the image acquisition board for computing visual angle, and scaling the pixel output signals for computing contrast from the absolute value in relation to a predetermined light intensity received by the camera 1, and providing a substantially constant and linear relationship capability between the light input and pixel value output signals over substantially the entire pixel sensor array and the light range of operation.

The predetermined light intensity received by the camera 1 is determined in this embodiment by the setting of the variable aperature lens 2. However in other embodiments this may achieved, by for example, using spectrally neutral values.

In tests to verify the present invention the video camera 1 was on RCA model TC-101 charge-coupled (CCD) video camera. The CCD camera was used because of its inherent linearity and lower geometric distortion. Another reason for choosing this camera was because it was possible to modify the camera to obtain the accurate spatial - light data required.

The camera contained a 532 horizontal by 504 vertical element (9 mm by 6.5 mm) interline transfer CCD sensor. The sensor array 4 was a silicon based semiconductor that collects photons at discrete locations, called storage elements, and converts these photon counts into an electrical signal. Images were produced from 250,920 storage elements, 510 horizontal by 492 vertical. (As will be discussed later however, only 480 vertical lines were used since this is the maximum vertical resolution with the memory spatial array 14 of the image acquisition board 12. The manufacturer guaranteed that there were no more than six defective storage elements in the sensor array 4.

As has been previously stated, storage elements, such as those designated 6 to 9, in the sensor array 4 were not used as part of the image but were used as "black" reference values. Because the output of the CCD camera was temperature dependent, these "black" elements 6 to 9 were used to define the zero light value and thus set the output values for the picture elements, or pixels. In this way, data generated by the camera 1 was minimally affected by temperature variations. All tests were performed, however at a room temperature of 21 degrees C.

Since the camera was intended for commercial video applications, the sense array was sampled at 9.46 MHz and the signals from the storage elements were output according to the RS-170 television standard. This standard requires a composite signal containing both image and synchronization signals having a 1 V peak-to-peak amplitude into a 75Ω load.

Except for the following three modifications, the camera was utilized as delivered from the factory. First the infra-red (IR blocking filter, anterior to the sensor array, was removed since its transmission characteristics were unknown, Second, an adjustment was performed inside the camera to establish a linear relationship between input light (luminance) and output. Thus, if output=input $\gamma$, then by this modification $\gamma = 1$. With $\gamma = 1$ there was equal brightness resolution over the entire (unsaturated) image at the expense of a larger dynamic range within a given image. Finally, the automatic gain control (AGC) was disabled so that the input/output relationship would be constant over the full range of scene light (luminances). Adjustments for different scene light (luminances) were accomplished with a variable aperture lens 2.

The variable aperture lens 2 was that marketed as a Cosmicar ⅔ inch, f/1.8, 12.5 to 75 mm multi-refractive element zoom lens, and was equipped with a standard C mount. A zoom lens was employed because it afforded closer inspection of small targets without moving the camera. The lens 2 was equipped with standard apertures from f/1.8 to f/22 with a detent at each f stop. The lens focal length was continuously variable from 12.5 to 75 mm, although for target size calculations it was always set by the operator to one of six labeled values (12.5, 15, 20, 30, 50, or 75 mm). Focal distances ranged from 1 m to infinity.

The spectral sensitivity of the camera (without the IR blocking filter) was specified by the manufacturer. These data were used to design the filter means 10 in the form of a V-lambda filter package that would convert the camera's spectral sensitivity to that of the CIE standard observer the filter package comprised three glass filters 20 to 22, details of which are given in the following Table 1.

TABLE 1

| Filter | V-lambda Filter Package | |
|---|---|---|
| | Glass Type | Glass Thickness |
| 20 | Schott BG38 | 3.30 mm |
| 21 | Schott KG3 | 4.00 mm |
| 22 | Corning 3307 | 3.16 mm |

With this filter package, the response of each pixel in the sensor array 4 to the electromagnetic spectral was related to luminance. The output from the camera 1 was calibrated in units of nits, or $cd/m^2$. A filter mount (not shown) was specially constructed for this correction filter package and fixed anterior to the first refractive element of the zoom lens 2.

The image acquisition board 12 used was that marketed by Imaging Technology Inc. as PCVISION-plus ™ which was an stage acquisition board for a PC/AT personal computer. Although several image acquisition boards were commercially available, this product was chosen because the spatial resolution was very close to that provided by the CCD camera 1, and any greater resolution by the board could not have been utilized and, any less would have degraded that available from the camera 1. Except for a change in the memory buffer address, the image acquisition board 12 was used as delivered from the factory. The board 12 could accept two RS-170 video signals and several synchronization signals. Video signals from the camera 1 were passed to an dc restoration circuit in the board 12 which corrected for any drift in the video signal level the signal then went to a programmable gain and offset amplifier and on to an 8-bit analog-to-digital (A/D) converter. The A/D converter digitized the video signal and stored the pixel values in the frame memory 14, which was organized as two frame buffers of 512×480 pixels each. The output digital-to-analog (D/A) converters could be connected to either of the frame buffers and used to reconstruct the RS-170 video signal for display on the video target viewer 16.

The video target viewer or monitor 16 was a Panasonic WV-5410 monochrome monitor and it was connected as shown to view the images acquired by the camera 1 and processed by the image acquisition board 14. Only a monochrome, or black-and-white, monitor was required because the luminance data contained no color information. This particular monitor was chosen because it had a desirable underscan feature which allowed all of the acquired image to be displayed on the screen.

The monitor served essentially as a view-finder for the system operator. The images displayed on the screen were not intended to be acurate representations of the luminance values stored in the computer 18. Indeed, the monitor has non-linear characteristics and could not be used for this purpose. Therefore, the monitor was only used for locating targets of interest and to set the general exposure level for the camera 1.

The image acquisition board was mounted inside the computer 18 which was an IBM PC/AT compatible computer and included an 80287 math coprocessor. Other conventional hardware of the computer 18 included disk drives, a monitor 24, and a keyboard 26. A mouse was used as an optional feature in conjunction with the ImageActionplus TM software.

To facilitate calibration, several software packages were installed on the personal computer 18. All software was run under the MS-DOS V3.20 operating system.

The main piece of software used throughout the calibration was ImageActionplus TM, which was produced by the image acquisition board manufacturer (Imaging Technology, Inc.). This program came with mouse and menu support and could easily acquire, manipulate and process images.

A Microsoft TM C compiler, RS/1 TM and Lotus 1-2-3 TM were used to perform some calibration calculations. A diagnostic program PCPLUSCD was used to verify the correct operation of the hardware ITEX PCplus TM, a library of routines for creating user programs, was also used.

An important part of the linear response system was to establish a correct zero value. Without a fixed zero value it would have been impossible to perform arithmetic manipulations of the data and retain accurate values.

As stated earlier, the camera 1 utilized some storage elements in the sensor array to correct for temperature variations, these storage elements, on each of the 492 horizontal lines of the array, were used as reference "black" values to maintain a constant black-level in the entire image.

The image acquisition board 14 employed two features to further ensure correct zero values, a dc restoration circuit and a programmable zero offset adjustment. The dc restoration circuitry corrected for any drift in the black-level signal from the camera 1. The programmable offset adjustment set the output black signal voltage to correspond to a particular input signal the purpose of this adjustment was to fine-tune the response level and, although irrelevant for this application, to permit non-standard video signal inputs.

In principle, every pixel should always have generated zero output in darkness Empirically, however, captured dark images (i.e., with the lens cap on) produced variations in pixel values of five or more counts. These variations were likely due to thermal effects and nonuniformities in the CCD camera response With the programmable offset of the board adjusted to 73 the average pixel count in the dark was about seven counts. Thus no pixel value ever dropped to or below zero. With this zero offset setting positive values were associated with the true dark values for every one of the approximately 250,000 pixels. In each subsequent image acquired the positive value representing the dark value was substracted from the corresponding pixel value in the image. In this way the largest dynamic range of voltage could be assigned to the scene luminance in the acquired images without introducing a low luminance "clipping" non-linearity.

All calibrations were performed with this offset setting. Once set, this value was intended to be maintained in non-volatile memory. Some difficulty was experienced with this feature, however, so in the application software the offset value was always reset to 73 prior to image acquisition.

Thirty-two dark images were acquired and averaged to give a black "correction image" used for calibrating subsequent image measurements. The majority of pixels in this image had counts ranging between three and nine with a mode of seven. Interestingly, this dark image was composed of five equally wide horizontal bands differing by one count in luminance; the brightest band was in the center of the image falling off symmetrically to the top and bottom. The dark image was found to be likely to change with temperature and so new dark images were obtained prior to image acquisition of actual scenes.

With the video camera and image board modifications described above, together with the V-lambda correction filter 10 on the objective lens 2, the output video signal was linearly related to the number of photons impinging on each photosite. That is, the output of the system was linearly related to scene luminance between noise and response saturation. The slope of the linear function relating scene light (luminance) to system output could be changed, however, by a programmable gain amplifier in the input section of the image acquisition board 14. This modification set the amplification of the RS-170 composite signal. The gain could be adjusted from 0.67 to 1.33 in 100 steps. Large values increased the resolution at the expense of dynamic range between noise and saturation and vice versa. Consequently, a middle gain value was preferred for most applications. The factory setting of 50 was found satisfactory in this regard; this value was reset before each image acquisition.

The CCD sensor array was inherently linear. Coupled with the video camera 1 and image processing board 14, however, non-linearities between input and output could be produced. Tests were therefore performed to ensure that data produced by the system, after the system modification described above accurately scaled light (luminance) information in the visual scene.

In FIG. 2, similar parts to those shown in FIG. 1 are designated by the same reference numerals and the previous description is relied upon to described them.

FIG. 2 shows the way that the camera 1 of the device shown in FIG. 1 was used in tests to verify the present invention.

In FIG. 2 there is shown an optical bench 28, a calibrated light source 30, a regulated dc electrical power supply 32 and a calibrated barium sulfate reflectance standard 34.

In the tests, the light (luminance) of the reflectance standard 34 at different distances from the source 30 was calculated using the inverse square law. Thus, it was possible to produce precisely known luminance values for measurement by the device shown in FIG. 1. (These expected values were verified with a light (luminance) photometer).

FIG. 3 shows the data obtained with a camera aperture of f/16 and the linear equation best fitting those data using a least squares criterion. The V-lambda filter 10 was removed for this test to increase sensitivity. The filter 10 has no effect on the linearity of the system as long as the spectral power distribution of the source does not change, as was the case for this test. These data establish then, that the device shown in FIG. 1 responds linearly to changes in scene light (luminance), in the response range between noise and saturation.

Adjustments to the exposure of the sensor array 4 must be made for different brightness levels in the visual scene. Since the automatic gain control in the camera 1 was disconnected, the sensor array exposure was controlled by varying the lens aperture of lens 2. Although the system retained its response linearity (between noise and saturation) with these changes, the slope of the response curve changed by factors related to the areas of the lens apertures of the lens 2. Thus, if the slope of the response curve was 1.0 for a given f stop, then reducing exposure by one stop (nominally a factor of 2) produced a response curve slope of 0.5 with the new aperture Under the experimental setup shown in FIG. 2, the areas of the different apertures of the lens 2 were deduced. With a fixed amount of light falling on the reflectance standard 34, output from the (linear) device shown in FIG. 1 was measured for two successive aperture settings demarcated by the lens aperture detents. The ratios of outputs from successive aperture settings are presented in the following Table 2. Depending upon the sensitivity range, measurements were made with and without the V-lambda filter 10. All measurements were obtained from pixels in the center of the captured images. By restricting the measurement area to the center of the image, vignetting (response falloff at the image edges) was avoided. (Vignetting was a problem with this system and is discussed in detail later). The ratios for different aperture settings were different from the expected values of 2.0. These values were considered accurate to within about 3%. This uncertainty is caused by mechanical inconsistency in the aperture mechanism.

TABLE 2

| The relative areas of successive f stops | |
|---|---|
| Aperture Ratios | |
| F/Stop | Ratio |
| 1.8 | 1.02 |
| 2.0 | 1.77 |
| 2.8 | 1.89 |
| 4.0 | 1.84 |
| 5.6 | 1.95 |
| 8.0 | 2.12 |
| 11.0 | 2.22 |
| 16.0 | 2.01 |
| 22.0 | — |

To determine the response function for the device shown in FIG. 1 with every aperture under actual operating conditions (i.e., when measuring luminance), it was necessary to obtain data with the V-lambda correction filter 10 in place with an aperture of f/2, again using the experimental setup shown in FIG. 2. These data are also described well by a straight line of slope 1.095, thus providing a gain of 0.913 cd/m$^2$ per count (system response value) for the f/2 aperture. Using the ratios in Table 2, it was then possible to determine the gain values of every other aperture with the V-lambda correction filter 10 in place. It should be noted, however, that with a 3% uncertainty for a given aperture value, some accumulated error possibly occurs when using the ratios in Table 2.

It was necessary to evaluate the spectral response of the device shown in FIG. 1 with the V-lambda correction filter 10 attached. It was thought that the filter 10 would make the spectral sensitivity of the device shown in FIG. 1 exactly equal to V-lambda The spectral response of the device shown in FIG. 1 is given in FIG. 5 and this was compared to that of a high quality Pritchard laboratory photometer whose spectral sensitivity is documented to be very close to V-lambda. A comparison between the two devices was performed using a variety of comercially available light sources, each having different spectral power distributions. Since the device shown in FIG. 1 was designed for use in actual environments, this procedure was thought to be sufficient for estimating error magnitudes for most lighting applications.

Eight light sources having different spectral compositions were selected: incandescent (I), high pressure sodium (HPS), low pressure sodium (LPS), metal halide (MH), mercury (M), cool-white fluorescent (CWF), warm white fluorescent (WWF), and vita-lite TM fluorescent (VLF). Using the standard 0–45 degree photometric geometry (Wyszecki and Stiles, 1982), these sources illuminated, in turn, a barium sulfate plate which was viewed, again in turn, by the two photometric devices from a distance of about 1 m.

FIG. 6 shows the ratio of the camera output to the Pritchard luminance values, normalized for the incandescent source. All camera values were obtained with an aperture of f/2.8 except that for incandescent lamp which was taken at f/2. To minimize potential errors from vignetting only the pixels from the central area of image were considered.

The differences between the output from the device shown in FIG. 1 and the Pritchard device were found to be small, never exceeding 8%. It should be noted, however, that those light sources with mercury line emissions (254, 313, 365, 405, 436, 546 and 728 nm) were associated with the largest error. This error may be due to improper UV blocking for the V-lambda filter 10 or using "typical" spectral sensitivity data rather than that for the particular camera 1; this may be corrected by using filters. Correction factors taken from FIG. 7 can be used to minimize these small errors while acquiring image illuminated by sources with mercury line emissions.

The device shown in FIG. 1 should ideally produce the same response for the same scene luminance anywhere in the image. In order to check for any inconsistencies in pixel responses to the same scene luminance, it was necessary to develop a technique that would provide equal scene luminances throughout the captured image.

Images were acquired of the interior of a 1 m integrating sphere, illuminated with either a 100 or 300 W incandescent lamp. The camera lens 2 was aimed at the opposite interior wall of the sphere and defocussed during image acquisition to minimize the effects of paint imperfections. Thirty-two images were acquired and averaged to further reduce the impact of these imperfections.

Using this technique it was determined that the camera lens 2 produced vignetting. Thus, more light from the equal-luminance scene reaches the center of the focused image than the edges. Consequently, points of equal luminance in a scene did not create equal pixel responses throughout the image. The magnitude of lens vignetting depended on the aperture setting and the zoom lens focal length. In the device shown in FIG. 1, 9 lens apertures and 6 focal lengths were employed. Without correction the same visual scene produced 54 different sets of luminance data, one for each combination of lens aperture and zoom lens focal length. It was found that vignetting could be overcome to a large degree through software manipulation. This was not an ideal solution, and proper optical components can be incorporated into the device shown in FIG. 1. Fifty-four calibration images, based upon an average of thirty-two images of the hemisphere wall, were obtained and stored for subsequent image corrections. By multiplying each acquired image by the inverse of its respective calibration image, the same scene luminance produced the same pixel response throughout the image for any aperture and zoom focal length.

As with other optical devices, errors can be created by dust and dirt on the optical components. These errors are particularly noticeable with the device shown in FIG. 1. Dust particles on the lens 2 and sensor array surface cause circular dark spots in the image. The larger the aperture the larger the spot diameter; the closer the particle to the sensor array 4, the sharper the image. The luminance of the areas shaded by the dust were of the order of 3% darker than unshaded areas. Before calibration the optical components were thoroughly cleaned, but, unfortunately, it was impossible to remove all of the dust. Thus, the calibration images record these occasional spots. Consequently small errors, of approximately 3%, were observed in some areas of the scene if between calibration and subsequent image acquisition the location of the spots had changed, the spots were removed, or more dust accumulated on the optical components.

The image quality of any optical device depends upon its refracting (and reflecting) elements as well as the spatial resolution of the photosensitive medium. Imaging systems could be characterized by the modulation transfer function (MTF) which describes how well each spatial frequency (luminance cycles per distance) could be resolved.

As for all imaging systems, there is a loss in image fidelity with the device shown in FIG. 1 at higher spatial frequencies. In other words, the image contrast of small details was less than it actually was in the visual scene. Ignored, these losses produced errors in measured contrast and, consequently, calculated levels of visual performance. Importantly, these losses also found in conventional optical photometers, but are rarely if ever reported. Therefore, such losses must be considered for every optical system.

To adequately define the spatial frequency response of the device shown in FIG. 1 it was necessary to perform measurements in both the horizontal and vertical directions because the camera array 4 and imaging board 2 were not isotropic. To minimize aliasing in the horizontal direction there was an electronic filter for the video signal in the input stages of the image acquisition board 4. It had a 3 dB cutoff frequency (70% of maximum) of 4.2 MHz. Since the horizontal scanning rate was 63.5 $\mu$sec/line, the 3 dB cutoff frequency of 4.2 MHz limited the resolution to 270 cycles/frame in that direction. To avoid aliasing, the sampling thereof required that the video signal be sampled at the Nyquist rate, i.e., at a rate which is twice the highest frequency contained in the video signal. The line-by-line sampling rate of 512 pixels/line was approximately twice the filter cutoff frequency of 270 cycles/frane as required by the sampling theorem. There was no corresponding filter in the vertical direction, so aliasing was to be expected.

Normally, the MTF is specified in terms of cycles per degree subtended by the target. Since the device shown in FIG. 1 was equipped with the zoom lens 2 it was necessary to define the MTF in terms of cycles per image frame. This was the number of cycles subtended by the active area of the sensor array 4 in the horizontal or vertical direction. (The horizontal direction was larger than the vertical by a factor of about 4/3.)

The target used in the tests was a periodic stimulus comprised of 48 dark bars on 203 mm wide white paper. The target was produced with a 300 dot per inch laser printer. A bar stimulus was used instead of the more conventional sine wave stimulus because it was easier to produce and provides similar results. The stimulus was placed 1585 mm from the plane of the camera sensor array for the horizontal line measurements and 2092 mm for the vertial line measurements. The zoom lens 2 was used to vary the spatial frequency of the target on the sensor array 4. The target was illuminated with ambient room lighting from cool-white fluorescent luminaires. The V-lambda filter 10 was removed to achieve greater sensitivity at a lens aperture of f/2.

All acquired images were offset corrected and measurements were taken only in the center of the image to avoid vignetting. The maximum and minimum pixel values over several cycles were measured. Contrast (C), as defined in equation 1, was calculated and modulation, relative to the observed contrast at the lowest measured spatial frequency (C=0.89 at 28 cycles/frame), was plotted as a function of cycles per frame in FIG. 8.

$$C = (Lb - Lt)/(Lb + Lt) \tag{1}$$

where, $Lb$ = average luminance of the white paper
$Lt$ = average luminance of a dark bar FIG. 7 shows that errors occured in measuring the luminances of targets smaller than 58 cycles/frame. To know where measurement errors would occur with the device shown in FIG. 1, it was found that the actual size of target must be related to the size of the image frame for a given focal length. The number of cycles/degree in the target can be related to the number of cycles displayed in a frame and the focal length of the lens by equation 2:

$$\text{cycles/frame} = \text{cycles/degree} * k/f \quad (2)$$

where $$\begin{aligned} k &= \text{degrees} * \text{nm/frame} \\ &= 420 \text{ in the horizontal direction} \\ \text{and} &= 320 \text{ in the vertical direction} \\ f &= \text{focal length of lens, in mm.} \end{aligned}$$

These values of k were determined empirically from the lens focal length, the number of cycles/degree in the bar stimulus, and the number of cycles displayed in an image frame.

To avoid this problem with the device shown in FIG. 1, it was deduced that objects must fill at least 2% of the imaging frame 14. This was determined from the data in FIG. 7 which showed that the luminances of objects having a fundamental frequency greater than 58 cycles per frame (either vertically or horizontally) will be attentuated by the high frequency cut off. At maximum zoom (focal length of 75 mm) the (vertical) image frame covers 4.3 degrees (FIG. 9). Thus, objects 0.086 degrees (5 minutes of arc) or larger were found to have negligible luminance attentuation due to the high spatial frequency cut shown in FIG. 7. This limit is better than that for most conventional luminance photometers. Values for other focal lengths may be determined from the data in FIG. 8 where the field deg are plotted against the focal length of the camera 1. A macro lens will be affixed to the camera 1 for measurements of still smaller objects.

In some embodiments of the present invention the sensor array 4 could rapidly scan a visual scene to produce a two-dimensional image.

In other embodiments of the present invention the filter means 10 may be one of a plurality of different filter means 10, 36 and 38 which are used sequentially to deduce colour information. For example, long, medium and short wave filters 10, 36 and 38 respectively, could be used sequentially to deduce colour information.

It is within the scope of the present invention to use more than one camera 1, filter 10 and image capture board 12 in the device in order to obtain colour information.

Embodiments of the present invention may be used, for example, to align lamps in reflectors, to measure different light intensities for horticultural purposes at different positions in, for example, greenhouses in order to adjust the lighting towards uniformity throughout the greenhouse, for measuring the different light intensities in studios to enhance photographic and television reproductions, and for measuring different light intensities to improve the visibilities of, for example, roads or airport runways.

The following are the relevant pages of a user's manual that has been compiled for the device shown in FIG. 1. The particular form of the device shown in FIG. 1 is referred to in these pages as the CapCalc system, and the manual is based on tests carried out with this system.

The following trademarks are used in these pages; IBM and IBM personal computer AT are registered trademarks of International Business Machines Corporation. PCVISIONplus is a registered trademark of imaging Technology Inc. RCA is a registered trademark of RCA Corporation. COSIMICAR is a registered trademark of ASAHI Precision Company Ltd. PANOSONIC is a registered trademark of Panasonic Corporation.

1.0 PROGRAM OVERVIEW

1.1 Introduction to Version 1.0 of System

CapCalc stands for Capture and Calculate. The CapCalc system accurately measures a large number of luminances and quickly performs lighting analyses on those data. The system is a synthesis of state of the art components including a solid state Charged Couple Device (CCD) video camera with a photopic spectral correction filter, and a personal computer with a digital image processing board. The capability and potential for the system make it valuable for a wide range of application.

The calibrated video camera acquires luminance data much like the typical spot luminance meter, but unlike a spot meter, it simultaneously resolves an entire scene into approximately 250,000 luminance measurements. These data are then stored by the digital image processing board.

There are other important aspects of the visual scene made available for evaluation by use of the video camera. Not only is a large number of luminance values available, but their precise spatial relation is maintained. Therefore, the acquired image also allows for the determination of object size, shape, contrast, and viewing distance within the visual scene.

The personal computer dramatically reduces the time required to understand and evaluate lighting analyses currently, the software calculates Relative Visual Performance (RVP). However, the menu driven software will be expanded to perform other procedures. Selection and learning of the various procedures are made easy by using help screens. Any information required from the user is prompted for and checked by the software upon entry so that mistakes are detected In short, the system is a practical tool for both lighting application and education.

This system is also a tool for research The convenient ability to capture and have access to such a complete array of luminance values within an image has never been possible before. Issues regarding brightness, size, and shape will be easier to investigate. Having this information available will facilitate a more complete understanding of human response to light and lighting.

This manual discusses how to use the capabilities which are currently available with the CapCalc system. Although every attempt has been made to produce a fail safe system, the National Research Council Canada assumes no responsibility for the validity, accuracy, or applicability of any of the results obtained from the use of CapCalc. However, any comments, suggestions or errors encountered in either the results or the documentation should be brought to our attention. cl 1.2 System Capabilities CapCalc is an extensive measurement and analysis system. The software is designed and documented for ease of use. Menu driven activities permit complete flexibility and control of the system capabilities. Its major capabilities include:

a. With the use of a calibrated video camera and digital image processing board, an image is quickly acquired, digitized, and stored as approximately a quarter million luminance values. The reader should refer to Appendix A where a technical report is provided which discusses the camera and computer.

b. All image and luminance information can be saved on disk under a user specified image file name for future use. This information can also be easily retrieved or erased.

c. Portions of the image can be isolated by placing a user specified rectangular frame around the area of interest. The details of the image within the frame can be more easily observed by scaled enlargement (magnification).

d. The user can scan an image with a cursor observing the luminance at any desired pixel location.

e. The resolution of luminances within the framed area of an image can be reduced. This process is used for converging luminances of a similar level, and will be explained in more detail later. The visual result produced on the image by doing so, is a contouring of the luminances to a new specified number of steps. This is helpful for purposes of separating areas of the image, such as target and background for calculations.

f. Relative Visual Performance (RVP) can be calculated for any user specified target, background, and size within an image, as well as determining the consequences of observer age in the investigation. The results are immediately displayed to the user. The reader should refer to Appendix B where three technical reports are provided which explain RVP.

g. On-line documentation is available to help the user during system use. This is user documentation which can be displayed on the computer screen for assisting in system use. Status lines are also located at the bottom of the screen to inform the user of current activities and errors encountered by the system.

1.3 What You Need to Use CapCalc System

To insure proper system operation and complete use of all the features and capabilities of the CapCalc system, you should have the following:

1.3.1 Personal Computer and Configuration

IBM Personal Computer AT, or fully compatible microcomputer configured as below:
IBM AT System Unit with at least one 1.2 Mbyte high-density diskette drive and a 20 Mbyte hard disk
Expanded memory to 640K with DOs Version 3.0 or higher
80 column monitor
80287 Numerical Data Processor chip: "Coprocessor" (Optional but strongly recommended)

1.3.2 Calibrated Video Camera and Video Monitor

RCA Solid State CCD Video Camera model TC100 (electronically modified for luminance measurement). The camera should always be mounted on a tripod or other rigid device.
COSMICAR TV ZOOM LENS (fitted with additional optical filter for luminance measurement) 12.5mm-75mm 1:1.8. The lens cap should be kept on the lens when the camera is not being used.
Panasonic WV-5410 black and white video monitor. Any RGB or black and white video monitor of equal specification will suffice (refer to Panasonic WV-5410 Operation Instruction manual for specifications)

1.3.3 Digital Image Processing Board

Imaging Technology's PCVISIONplus Frame Grabber and cable that connects it to the calibrated camera and display video monitor.
Imaging Technology's PCVISIONplus Frame Grabber User's Manual (this is necessary for installation of Frame Grabber board and other video equipment)

The combination of camera, lens, and digital image processing board have been calibrated at the National Research Council Canada, and delivered to you along with this manual, and the Frame Grabber manual. Due to the unique characteristics of each camera, lens, and processing board, the results of calibration for each system are slightly different These differences are compensated for by unique calibration factors which are used by your system software For this reason, your system is given a unique number which is recorded at the beginning of this manual.

The serial number for each of these system components is also recorded for your reference. Only these components should be used with your CapCalc system software to insure accurate luminance measurement.

1.3.4 User's Manual and Master Program Diskettes

CapCalc user's manual and master program diskettes. The following diskettes comprise the CapCalc system software
CapCalc System Software (CC1)
CapCalc Run Data 1 (CC2)
CapCalc Run Data 2 (CC3)
CapCalc Run Data 3 (CC4)
A sufficient number of blank high-density diskettes for master program diskette back-up and image file and luminance information storage.

1.4 Getting Started

The CapCalc user's manual, and system software provide all of the information needed to operate the CapCalc system successfully and to have it become a useful tool for luminance measurement and analysis applications. The following sections provide instructions to help you set up the system and, get started.

1.4.1 Backing up Master Program Diskettes

The master program diskettes included as part of the CapCalc system package contain the software and run data which is used by the software They must be carefully protected to insure against loss or damage to the software. Therefore, before attempting to install the software onto the computer hard disk and run CapCalc, it is important that you do the following:

1) The four master diskettes have been tested prior to shipment. If you suspect that any of the master diskettes you received have been damaged, contact the National Research Council Canada immediately.
2) Make a copy of each CapCalc master diskette which you have received. To make the necessary copies the master diskette should be copied to an empty directory on the C drive. Then, a blank, formatted high density diskette should be placed in the A drive and all files from the chosen directory on the C drive, copied to the A drive. This should be repeated for each master diskette This set should be labeled as the "back-up-version", while the master set should be saved in a safe place where it will not be damaged.

Note; All diskettes used to back-up the master program diskettes should be double-sided and high-density.

The CapCalc system software must be operated from the hard disk of the IBM AT. For an explanation of the system software installation on the hard disk, please refer to the next section

1.4.2 Installation of Software onto Hard Disk

Due to the disk space necessary to store image file and luminance information, the CapCalc system software has been designed to run on an IBM AT that includes a hard disk. The recommended arrangement for installing the CapCalc software involves placing all of the contents of the system software diskettes into a single subdirectory on the hard disk. This subdirectory is assumed to be named "CAPCALC". To perform this you need to do the following:

Step 1: With the computer on and at the <C> prompt, initialize subdirectory CAPCALC by typing "MKDIR CAPCALC"

Step 2: Successively insert each of the CapCalc system software diskettes into drive A, and type "COPY A:*.* C:CAPCALC".

After all files have been copied to this subdirectory, the installation of CapCalc on the hard disk is complete.

Each time you wish to run the CapCalc system software you should be in the CAPCALC subdirectory. To get to the CAPCALC subdirectory, type "CD CAPCALC"

1.4.3 Installation of Video Equipment

The PCVISIONplus Frame Grabber is a video digitizer and frame memory capable of digitizing the standard RS-170/330 video signal received from the calibrated camera The digitized image is then stored in a frame memory on the Frame Grabber This image is simultaneously displayed on the video monitor.

The PCVISIONplus Frame Grabber must be placed into the IBM AI expansion slot to allow the CAPCALC system software to perform the various image analysis processing. In order to perform the proper configuration and installation of the PCVISIONplus Frame Grabber, the reader is directed to the PCVISIONplus Frame Grabber User's Manual which accompanies the Frame Grabber. Chapters 2-3 of the Frame Grabber User's Manual contain the information necessary to perform this task. Chapter 3 will also explain how the video camera and monitor are connected to the Frame Grabber, which completes the process of installing the video equipment. Note the address of the frame grabber must be changed to D0000.

1.4.4 Additional Diskettes

In addition to the floppy diskettes to which you copy the CapCalc system software diskettes, you may want to keep handy additional blank formatted diskettes to store image file and luminance information. The image file and luminance information can take considerable disk space (approximately 500K), so for your own hard disk maintenance purposes, you may wish to store old files and information to floppy diskettes

1.4.5 Using This Manual

The remaining chapters of this manual contain information concerning the operation of the CapCalc system Chapter 2 discusses the concept and control of menus, as well as describing the online help and status lines which further aid in making effective and efficient use of the system. Chapter 3 describes in more detail each main menu and sub-menu activity A step by step example of how to use the CapCalc system can be found in Chapter 4. The Appendices contain various technical information, reports, and references for a deeper understanding of the system.

It is recommended that you carefully continue through all of the information in the following chapters. Once you are familiar with the structure, terminology, and use of the system, this manual will take on the role of a reference document, and will find only occasional use.

2.0 CAPCALC SYSTEM SOFTWARE TECHNIQUES

Luminance measurement and analysis with the CapCalc system is performed with the supplied equipment and software. The system software gives step by step instructions on what the user must do with the equipment to acquire and analyze the luminances. All of the activities to perform the steps are arranged as menu items.

This chapter will introduce the CapCalc system software initialization, structure, and techniques for use of the system. It will discuss how you are able to move around within the software to perform the task of interest, and some features that will facilitate this process.

Note All information in this manual which appears on the screen will be shown in bold print to help distinguish the screen display from descriptive text.

2.1 Preparing Your IBM Personal Computer AT

To begin a session with the CapCalc system, your IBM AT must first be on and at the system prompt within the CAPCALC subdirectory of the hard disk. Be sure that your video equipment is plugged in and turned on. You may want to check the date and time kept by your computer so that all files on the diskette directory will be properly recorded. To initialize the system software, type CAPCALC after the <C:CAPCALC> prompt. The program title will appear in a window. A window is a rectangular area on your screen, usually bounded by a border, which is used for various applications. Such applications will become apparent as you move along through this manual. The instructions "Hit Enter" will be printed at the bottom center of the window border

2.2 Introducing the Main Menu and Sub-Menu

After you have read the title window, press the [Enter] key to move ahead to the following main menu:

| Acquire | File | Frame | Calculate | Exit |
| --- | --- | --- | --- | --- |

A menu is a special application of a window which consists of a list of items. Each menu item performs a special function or activity, and is selected by typing the first character of the item or moving the highlight bar with the cursor arrow keys ([→], [52 ], [ ↓ ], [←]) to the desired item and pressing the [Enter] key. To leave the CapCalc system software and return back to DOS, the user selects the Exit item. The main menu in CapCalc consists of items displayed in a single-row multiple-column formatted window. For example, select the main menu item "Acquire". Upon selection of this item, the user is branched to another window containing a sub-menu as follows:

| Acquire | File | Frame | Calculate | Exit |
|---------|------|-------|-----------|------|
| Long    |      |       |           |      |
| Short   |      |       |           |      |
| Refresh |      |       |           |      |
| Number  |      |       |           |      |
| Clear   |      |       |           |      |
| Zeroing |      |       |           |      |

A sub-menu is a special type of menu which consists of activities relating to the previous menu item it has branched from. The control of a sub-menu is just like a standard menu. The user presses the [Esc] key to return to the item of the previous menu. The sub-menus in CapCalc consist of activities displayed in a multiple-row single-column formatted window. For example, select the sub-menu activity "Number". This activity performs a specific function, so upon selection the user is branched to yet another window containing the following instructions:

| Select number of images to be averaged. | 1 |
|-----------------------------------------|---|
|                                         | 2 |
|                                         | 4 |
|                                         | 8 |
|                                         | 16 |
|                                         | 32 |

The user can perform the instructions to accomplish the selected activity or return to the previous menu by pressing the [Esc] key. The purpose of this exercise has been to introduce the structure of, and techniques for moving around within, the software. At this time it is not intended to perform any activities, so please hit the [Esc] key twice to return back to the main menu. By the same method, one can observe sub-menu activities associated to the other main menu item. The selection of main menu item [Exit] will terminate the session with the CapCalc system software, and return to DOS.

2.3 On-line Documentation and Status lines

In addition to the help provided by this user's manual, there are two more convenient forms of assistance as follows:

1) The user can obtain online documentation by pressing the [F1] function key. This documentation is a reduced version of the information in the manual. Pressing the [F1] key will bring a window onto the bottom of the screen. In it will be documentation concerning the area of the software where the user is located. In most cases the explanation is larger than will fit into the provided window However, the user can scroll to various parts of this documentation by using the cursor arrow keys. Pressing the [Esc] key removes this window and returns control of the menu system to the user.

2) The two status lines at the bottom of the screen also supply helpful information. The first line keeps a current status of the file and path with which the user is working. The file is the name associated to the image and luminance information. A path is used to search a specified directory for a file. The second line is a short explanation of the particular activity where the user is located, and is also used for error and warning messages when encountered by the system software. The behaviour of these two status lines will be illustrated in Chapter 3.

3.0 DETAILS OF THE MAIN MENU AND SUB-MENU ACTIVITIES

This chapter will cover the details of each main menu item and related sub-menu activities It will cover the purpose of and user response to each activity. All of the activities have instructions which are displayed on the screen However, the explanations given here are more complete. A status line at the bottom of the screen gives a short explanation of the activity in which the user is currently involved. Should the user need a more detailed information, the online help is available at any time by pressing [F1].

3.1 Acquire

The luminance measurement process involves the selection of a scene with the camera and acquiring its image using the Acquire main menu item. To acquire an image it is necessary first to select a scene with the desired visual detail and then to adjust the zoom and aperture setting.

The zoom setting is used to increase the spatial resolution within the image. The system software keeps track of the original size for calculation purposes. Therefore the user is responsible for supplying this zoom information to the CapCalc system at image acquisition time. This information is maintained with the image. The losses of small spatial detail within the final image are due to the optical and the electronic imaging process. These losses are reduced if one moves closer to the object of interest to increase its size. The same effect can be produced by zooming in on the object. Essentially, objects of interest should fill 2% or more of a captured frame to avoid losses in spatial detail.

The final image is produced in several steps. First, an initial image of the scene is produced by focusing on the photosensitive CCD array within the camera. The dimensions of this array are 510 columns by 492 rows. Second, every discrete element of this array integrates the luminous portions of the image which falls onto it and converts them into a digital signal. Third, the digital image is transformed into the standard RS-170 analog video signal for transportation to the Frame Grabber within the IBM AT. The Frame Grabber then constructs a digital image for storage in the frame memory by digitizing the analog signal. This frame memory consists of an array with dimensions of 512 columns, by 480 rows. Notice that the array dimensions of the Frame Grabber do not match those of the OCD sensor. Therefore, information will be lost in the digitizing process to reconstruct the final digital image stored on the Frame Grabber.

The lens aperture is used to control the exposure of the CCD array. Therefore, the measured luminance levels must be scaled by the aperture setting to obtain the true luminance information within the scene. For this reason the camera is calibrated as a function of aperture setting and the user is responsible for supplying this information to the CapCalc system at time of image acquisition. This information is maintained along with the image.

The dynamic range of the camera is defined by the following system characteristics:
1) the maximum signal which can be tolerated by the sensor, and
2) the minimum signal it can resolve above the electronic noise (dark current). Electronic noise is an undesirable electrical disturbance of random amplitude and frequency which constitutes an irreducible limit on signal-resolving capability.

As mentioned above, the aperture is used to scale the scene luminance within this range. It is important to point out the following consequences of doing so:
1) If the aperture setting is such that parts of the image are above the dynamic range of the camera, then those portions are assigned the maximum luminance value and are referred to as "saturated."
2) If the aperture setting is such that parts of the image are below the dynamic range of the camera, then those portions of the image are indistinguishable from black (or noise).

Under some circumstances, the luminance range of a scene is greater than that which can fit inside the range of the camera at a single aperture Therefore, one of the following two conditions will arise:
1) In order to keep parts of the image from going dark, you must allow part of the image to remain saturated.
2) In order to keep parts of the image from being saturated, you must allow parts of the image to remain dark.

In either case you are sacrificing the ability of the system to generate accurate luminance data, because information is lost through saturation or noise. It is for this reason that multiple aperture image construction is available with the CapCalc system. This is a sub-menu activity of Acquire.

Due to the noise of the system, it is also necessary to perform the two following sub-menu activities to generate accurate luminances:
1) To improve reliability of a final image it is best to average the results of multiple images.
2) To estimate the noise level (dark current) produced by the system, an image is captured with the lens cap on. This zero level image is then subtracted from all subsequent images (without the lens cap) to scale the image luminances above the noise.

The noise stabilizes considerably once the system components have been on for at least one hour. The system components are on if the computer is turned on and the camera is plugged in. If the green LED on the back of the camera is illuminated, then the camera is on.

Upon selection of the Acquire main menu item, the user is branched to the sub-menu of activities which give instructions to perform these functions.

3.1.1 Long

The Long sub-menu activity permits the user to acquire an image using multiple apertures, which takes longer to perform than the Short activity (section 3.1.2). As discussed above, this process permits the accurate acquisition of an image which has luminances in the scene greater than the dynamic range of the camera. Note: It is important that the image be static and the camera not move during this entire process for two reasons:
1) The final image data are constructed from portions of
   multiple images captured at different aperture settings.
2) Successive images at each aperture setting may be created by averaging multiple images (section 3.1.4).

Upon selection of the Long activity the user is branched from the sub-menu to a window with the following message Select image of interest This instructs the user to position the camera on the scene of interest. The image can be observed on the video monitor. The camera should always be mounted in a stationary position, usually on a tripod. Once satisfied with an image, you can select it by pressing any key. Another window will appear on the screen with the following message:

| Select zoom setting from lens. | 12.5 |
|---|---|
| | 15.0 |
| | 20.0 |
| | 30.0 |
| | 50.0 |
| | 75.0 |

This informs the user to set the zoom setting on the lens to a position which produces the best spatial resolution of the image without losing any area of interest within the image. The setting must line up with one of designated focal lengths of 2.5, 15 0, 20.0. 30.0, 50.0, or 75.0 mm as shown on the lens barrel. This information is need by the software to compute the actual size information within the image Once the zoom has been set, the user should select the appropriate focal length from the above window using the arrow cursor keys and hitting the [Enter] key. Another window will appear on the screen with the following message:

Set aperture to 1.8

This informs the user to set the aperture at the position of highest exposure (aperture is fully open). Once the user does this, a window will temporarily appear to the screen with the following message:

Processing . . .

The system is acquiring an image or multiple images, (section 3.1.4) at the 1.8 aperture setting, subtracting the zero level (see section 3.1.6), and storing the information. After the processing is complete, if there is no saturation in the image, the user will be informed with a new instruction indicating the process in complete (below) If there is saturation within the image, then these portions of the image will begin flashing black and white, and another window will appear with the following message:

Flashing areas are saturated.
To measure higher luminance, set aperture to 2.0 and hit <ENTER>.
To accept picture as is, hit <ESC>.

This permits more of those portions of the image that were saturated at aperture setting 1.8 to come within the dynamic range of the camera After hitting [Enter], the software will once again acquire an image (or multiple images) and subtract the zero level, but this time considering only those areas that have now been reduced below saturation This process will continue through successive aperture settings (2.8, 4, 5.6, 8, 11, 16, 22) until no part of the image is saturated. Hitting [ESC] at any time terminates this sequence, leaving some saturation within the image (This implies that the saturated areas are of no interest to the user). Once the acquisition process has ended, a window will appear with the following message:

Long capture phase completed.
Select an aperture setting for which you are comfortable with the image Much of the image may go dark in order to bring all areas below saturation. For this reason, these instructions permit the user to select the preferred aperture setting which produces the best image for viewing. This information must also be maintained by the software So once the aperture has been set, hitting any key will display another window to the screen with the following instructions:

| Select Aperture setting from lens. | 1.8 |
|---|---|
| | 2.0 |
| | 2.8 |
| | 4.0 |
| | 5.6 |
| | 8.0 |
| | 11.0 |
| | 16.0 |
| | 22.0 |

The user then selects the appropriate aperture setting from the above menu which matches the setting on the lens barrel This is done by use of the arrow cursor keys, then hitting the [Enter] key. Once this is done, the user is returned to the sub-menu This last step in no way affects the stored data from the Long image acquisition process.

3.1.2 Short

The Short sub-menu activity is exactly like the Long activity (section 3.1.1), except the image is acquired with only one aperture setting. This requires a shorter period of time than the Long activity (section 3.1.1). The luminance range within a scene may be beyond the dynamic range of the camera, in which case the user must consider the unfavorable circumstances of saturation and noise described above (section 3.1).

Upon selection of the Short activity the user is branched from the sub-menu to a window with the following message:

Select image of interest

Once satisfied with the image the user continues pressing any key. A window with the following message will appear:

| Select zoom setting from lens. | 12.5 |
|---|---|
| | 15.0 |
| | 20.0 |
| | 30.0 |
| | 50.0 |
| | 75.0 |

This informs the user to set the zoom to line up with one of the designated focal lengths shown on the lens barrel. The user then selects the appropriate focal length from the above menu using the arrow cursor keys, then hitting the [Enter] key. Another window will appear on the screen with the following message:

| Select Aperture setting from lens. | 1.8 |
|---|---|
| | 2.0 |
| | 2.8 |
| | 4.0 |
| | 5.6 |
| | 8.0 |
| | 11.0 |
| | 16.0 |
| | 22.0 |

This informs the user to set the aperture on the lens to the desired position. Once again, the user should select an aperture setting that is the best balance for lost image due to saturation and noise. Flashing black areas of the image designate the saturated portion of the image. The user then selects the appropriate aperture setting from the above menu using the arrow cursor keys, then hitting the [Enter] key. Once the user does this, a window will temporarily appear on the screen with the follow message:

Processing

The system is acquiring an image or multiple images, section 3.1.4) at the selected aperture setting, subtracting the zero level (section 3.1.6), and storing the information. The user is then returned to the sub-menu.

3.1.3 Refresh

The Refresh sub-menu activity displays on the monitor the image which has the current image status (sections 3.2, 3.2.1 and 3.2.2) at the bottom of the screen. The image on the video monitor can be modified by performing any one of a number of submenu activities (section 3.3). It can also be completely cleared from the screen (section 3.1.5). Therefore, this activity is helpful to return to an unmodified display of the image.

3.1.4 Number

The Number sub-menu activity allows the user to select the number of images to be averaged during the Long (section 3.1.1), Short (section 3.1.2), and Zeroing (section 3.1.6) sub-menu activities. The purpose of averaging is to reduce the error associated with the electronic noise of the system (section 3.1). It is also important to mention that the time necessary to perform the averaging process increases with number. Under circumstances where a high order of accuracy is necessary, the user is recommended to use a high number. Acquiring 32 images takes approximately five minutes. For preliminary applications the user may find one image to be sufficient; this takes approximately twenty seconds to complete.

Upon selection of the Number activity the user is branched from the sub-menu to a window containing the following message:

| Select number of images to be averaged. | 1 |
|---|---|
| | 2 |
| | 4 |
| | 8 |
| | 16 |
| | 32 |

The user should select the desired number of images needed for his application using the arrow cursor keys and then hit the [Enter] key.

3.1.5 Clear

The Clear sub-menu activity allows the user to clear the video monitor to a completely black screen

3.1.6 Zeroing

The Zeroing sub-menu activity allows the user to acquire a dark image (with the lens cap on) which is subtracted from acquired images using the Long and Short sub-menu activities (sections 3.1.1 and 3.1.2). Although this image does not change very much with time or environmental conditions, it is recommended that this activity be performed at the beginning of each session to account for any small transient characteristic associated with the system. The camera and computer should have been turned on for at least one hour before the activity is performed.

When this activity has been selected the user is branched from the sub-menu to a window with the following message:

Place lens cap on Camera.

After the user places the lens cap and hits [Enter], another window will appear on the screen with the following message:

Processing . . .

This informs the user that an image (or multiple images) is being acquired and averaged to generate a dark image.

3.2 File

The File main menu item permits the user to name, store, retrieve, and erase images from the disk. It also allows for the selection of a path to the directory in which these operations are performed. Every image is stored under a single file name for future use. The current file and path status line at the bottom of the screen is used to display the file that has most recently been stored or retrieved and the directory in which it resides. Prior to performing any storage or retrieval activity, the current file and path status line has the following appearance:

| Current file: < none > | Current path: C: CAPCALC |
| --- | --- |

<none> signifies that no image has been stored or retrieved during this working session with CapCalc. However, if an image has been acquired and not yet stored it will be considered the current file until it has been stored or the session has been terminated. This allows the user to perform the Refresh activity (section 3.1.3) on an image that has not yet been stored. The current path status is always considered to be to the directory from which the system software was initiated unless otherwise changed by the Path activity (section 3.2.4). Upon selection of the File main menu item the user is branched to a sub-menu of activities which give instructions on how to perform these functions.

3.2.1 Save

The Save sub-menu activity permits the user to store an acquired image to disk for future use. Upon selection of this activity, a window appears on the screen with the following prompt:

| Enter File Name: | .VMI |
| --- | --- |

The user is responsible for typing in a file name within the input field and hitting the [Enter] key. The image is stored with this file name. The file name must be a legal DOS file name The extension of .VMI is automatically added to the file name for the purpose of file housekeeping. It is necessary that all image files maintain this extension in order to be recognized by the system. The system also determines whether a duplicate file name has been entered and issues a warning message in the status line at the bottom of the screen if this is the case. This prevents copying over the file information that was previously stored under the same name. Once a file name has been successfully entered the current file and path status line at the bottom of the screen changes to reflect the name For example, suppose the name FILE-NAME were typed into the above input field and [Enter] was hit. The current file and path status line would change to the following:

| Current file : FILENAME | *Current path : C: CAPCALC |
| --- | --- |

It is also possible to store an image to any subdirectory by using the Path activity (section 3.2.4).

3.2.2 Read

The Read sub-menu activity allows the user to retrieve previously stored images. Upon selection of this activity a window appears with an alphabetically ordered list of image, file names within the directory specified by the current path (section 3.2.4). This is shown by the following example:

| afile | bfile | .cfile | dfile |
| --- | --- | --- | --- |
| efile | ffile | gfile | |

The user selects the image file by using the arrow cursor keys and then pressing the [Enter] key. The system retrieves the stored image for display and further analysis. The current file and path status line also changes to reflect the selected file name. For example, imagine that bfile was selected, the current file and status line would display the following:

| Current file : bfile | Current path : C: CAPCALC |
| --- | --- |

It is also possible to retrieve an image from a different directory by using the Path sub-menu activity (section 3.2.4).

3.2.3 Erase

The Erase sub-menu activity allows the user to erase previously stored images. Upon selection of this activity a window appears with an alphabetically ordered list of image file names within the directory specified by the current path (section 3.2.4). This is shown by the following example:

| afile | bfile | cfile | dfile |
| --- | --- | --- | --- |
| efile | ffile | gfile | |

The user selects the image file by using the arrow cursor keys and then pressing the [Enter] key. As an example, let us assume that bfile was selected. The system then displays the following query:

ERASE BFILE.VMI (Y/N) ?<N>
This allows the user a final opportunity to check the file name which was selected. The user types a Y or y and hits the [Enter] key to continue with the erasing process. Otherwise, just hitting [Enter] will return the user to the sub-menu without erasing any information.

It is also possible to erase an image from a different directory by using the Path sub-menu activity (section 3.2.4).

3.2.4 Path

The sub-menu activity Path allows the user to select a directory in which file information can be stored, retrieved, or erased (sections 3.2.1, 3.2.2, 3.2.3). Upon selection of this activity a window appears with the following prompt:

New path:C:PATHNAME
This allows the user to select a new directory in which the Save (see section 3.2.1), Read (see section 3.2.2), and Erase (see section 3.2.3) activities will be performed. Prior to selection the prompt displays the path which is maintained in the current file and path status line at the bottom of the screen. Before the use of this activity the current path will be to the directory from which the system software was initiated. The user modifies the path by typing the desired path over the one displayed and then hitting the [Enter] key. By doing this the current file and path status line at the bottom of the screen will change to represent the newly selected path. If a path is typed that does not exist the user will be given an error message in the status line at the bottom of the screen and prompted again.

3.3 Frame

The main menu activity Frame permits the user to locate a rectangular frame around an area of interest within the image. Only this area will be considered in subsequent analysis. The cursor arrow keys perform a coarse movement for the frame and its edges, moving in steps of 5 pixels each time a cursor key is struck. For fine movement of one pixel steps the Shift key is held down with simultaneous use of the cursor keys. This area can also be magnified for ease of use. The process of magnification does not affect the actual size and luminance information about the scene used for calculation. Upon selection of the Frame main menu item, the user is branched to a sub-menu of items which give instructions on how to perform these functions.

3.3.1 Locate

The Locate sub-menu activity permits the user to position the rectangular frame in the general area of interest on the image. This process is viewed on the video monitor. Upon selection of this activity a window appears on the screen with the following message:

Move frame with cursor keys.
A rectangular frame will appear on the video monitor, and the user can move this frame with the cursor arrow keys. The frame will appear either in the position where it was last located if removed by the Hide activity (section 3.3.4), or in the center of the video screen if Locate had not been used earlier in the session. The right arrow cursor key will move the rectangle to the right, while the other arrow cursor keys perform related operations. The system software will not permit moving the frame past the physical limits of the screen.

3.3.2 Expand

The Expand sub-menu activity allows the user to enlarge the rectangular frame in order to incorporate the area of interest within the image. Upon selection of this activity a window will appear on the screen with the following message:

Enlarge frame with cursor keys.
The rectangular frame which is located on the video monitor can be enlarged by use of the cursor arrow keys. The right cursor arrow key will move the right edge of the frame to the right while keeping the left edge stationary. This will cause the top and bottom edges of the frame to stretch. The other arrow cursor keys perform related operations. The system software will not permit enlarging the frame passed the physical limits of the screen.

3.3.3 Reduce

The Reduce sub-menu activity permits the user to shrink the rectangular frame to incorporate the area of interest within the image. Upon selection of this activity, a window will appears on the screen with the following message:

Reduce frame with cursor keys.
The rectangular frame which is located on the video monitor can be reduced by use of the arrow cursor keys. The right cursor arrow key will move the left edge of the frame to the right while keeping the right edge stationary. This will cause the top and bottom edges of the frame to shrink. The other arrow cursor keys perform related operations. The system software will permit frame reduction to zero pixels wide or high.

3.3.4 Hide

The Hide sub-menu activity permits the user to remove the rectangular frame from the image. Upon selection of this activity, the rectangular frame located on the video monitor will disappear. To make the frame reappear in the same location the user must perform the Locate activity (section 3.3.1).

3.3.5 Magnify

The Magnify sub-menu activity permits the user to increase the size of the framed portion of the image. The size is increased by multiple integer factors of the original size. Upon selection of this activity, a window appears on the screen with the following prompt:

Magnification Factor (1–10): 1

The user is prompted to specify a desired integer value between 1 and 10 within the input field. This value will be used to scale the framed portion of the image. The actual target sizes are maintained in memory for calculations. The framed image is simply magnified for user convenience. Performing a magnification on an image can permit a closer look at the details within the frame. This activity will not permit magnification of a frame larger that the video monitor screen. It will warn the user if this is the case, and perform the largest magnification possible. It will also move the image within the boundary of the video screen if magnification is performed near the video screen border. A magnified frame can be returned to the original size by performing the Magnify activity again specifying a value of 1.

3.4 Calculation

The Calculate main menu item permits the user to perform analyses on the acquired image Currently, the user is permitted to calculate Relative Visual Performance (RVP). To facilitate analysis the user can contour target images and measure luminances within the image.

The system can only display image luminances in 255 steps of grey on the video monitor. However, the ratio of luminances stored in memory can be much greater that 255 to 1. For this reason pixels of identical appearance on the monitor may have different luminance. The ability to move a cursor over the image to determine the actual luminance at each pixel location is possible. The cursor arrow keys perform a coarse movement, moving it in steps of 5 pixels each time a cursor key is struck. For fine movement of one pixel steps the Shift key is held down with simultaneous use of the cursor keys. A global x-y coordinate system with origin (0,0) at the upper left hand corner of the video monitor is used. The unit of measure for the coordinate system is the pixel, so x ranges horizontally from 0 through 511, and y vertically from 0 through 479.

It may be helpful under some circumstances to pool luminances of nearly the same level. This process is much like averaging and may be helpful in separating the areas representing task and background while performing RVP calculations. The luminances within the scene can be resolved into a user selected number of equally spaced steps other than 255. The luminance for each new step is found by performing a pixel weighted average of the original scene luminances. A pixel weighted average is found by summing the pixel luminances and dividing by the total number of pixels. All of the pixels in the step are then displayed at the luminance determined from the pixel weighted average. This process produces luminance contours on the video image.

Upon selection of the Calculate main menu item the user is branched to a sub-menu of activities which give instructions on how to perform the these functions.

3.4.1 RVP (Relative Visual Performance)

The RVP sub-menu activity permits the calculation of Relative Visual Performance (RVP) for a visual task. RVP is a visual performance model based on the research of Dr. Mark Rea and his colleagues at the National Research Council Canada. (For more technical information regarding the research and development of this work the reader is encouraged to read the reference in Appendix B). This calculation requires four pieces of information obtainable from the image which are:
  (1) target luminance,
  (2) background luminance,
  (3) adaptation luminance,
  (4) and target size.

These four pieces of information are independent variables in the model for determining RVP. The target and background luminances are determined by the user selecting pixels within the framed area of the image. Adaptation luminance is determined by taking the average luminance of the entire image, which requires no user specification. The target size is determined from the number of pixels selected by the user to represent the target. This information is used to calculate the solid visual angle subtended by the target. The actual size information of the image is maintained in memory from the user defined zoom setting. Therefore, the Frame main menu item (section 3.3) is used prior to using the RVP activity in order to specify an area of interest which is the visual target and its background. A fifth independent variable which is not obtainable from the image file, is the age of the observer. Upon selection of this sub-menu activity, the user is branched to another sub-menu of activities which give instructions on how to specify the required variables.

3.4.1.1 Target

The Target sub-menu activity permits the user to specify the target luminance within the framed portion of the image. The Frame main menu item (section 3.3) should be used prior to this activity to specify a frame which completely encloses that portion of the image which is to be considered the target for the RVP calculation. To further distinguish between which luminances are target and background it may be helpful to generate a contour using the Contour activity (section 3.4.3). This will resolve the luminance into fewer steps, making a more distinct separation between areas which are considered to be target and background within the frame. Upon selection of the Target activity, the user is branched to a window containing instructions as shown in the following example:

Locate cursor on target and hit <Enter>
$x = 245\ y = 115$ Luminance $= 16.14$

The cursor is placed at the center of the frame, and the luminance with respect to the global coordinate system is displayed. The user is instructed to move the cursor to that position which is the target and then hit [Enter]. All of the pixels of the same luminance value within the frame will turn black. These pixels will be considered the target. The user can perform this process several times. Each time, a new pixel weighted average luminance is produced for the target and the size of the target will increase. When the user is satisfied with the area to be considered as the target, striking the <ESC> key will terminate the Target activity.

3.4.1.2 Background

The Background sub-menu activity permits the user to specify the background luminance within the framed portion of the image. The Frame main menu item (section 3.3) should be used prior to this activity to specify a frame which completely encloses that portion of the image which is to be considered the target for the RVP calculation. The area surrounding the target, and within the frame, can be considered as the background. It may be helpful to generated a contour using the Contour activity (section 3.4.3). This will resolve the luminances into fewer steps, making a more distinct separation between areas which are considered to be the background and the target. Upon selection of the Background activity the user is branched to a window containing instructions as shown in the following example:

Locate cursor on background and hit <Enter>
$x = 255\ y = 105$ Luminance $= 26.14$ The cursor is placed at the center of the frame and the luminance with respect to the global coordinate system is displayed. The user is instructed to move the cursor to that position which is to be considered the background and then hit [Enter]. All of the pixels of the same luminance value within the frame will turn white. These pixels will be considered as the background. The user can perform this process several times. Each time, a new pixel weighted average luminance is produced for the background. When the user is satisfied with the area that will be considered as the background, striking the <ESC> key will terminate the Background activity.

3.4.1.3 Age

The Age sub-menu activity permits the user to specify the age used in the RVP calculation Studies have shown that characteristics of the visual system deteriorate after age 20. The reader is referred to Appendix B for references regarding the results of age on the visual system and its treatment in RVP calculations. Therefore, if the user wishes to consider the effects of age, he can do so by using this activity. Upon selection of the Age activity the user is branched to a window containing the following prompt:

Age (20-65): 20
The user can retain the assumed age of 20 or type another age between 21 and 65 in the input field. After the assumed observer age has been specified the user strikes the [Enter] key. If the user specifies an age which is not within the limits (20 to 65), the system will issue a warning message in the status line at the bottom of the screen.

3.4.1.4 Process

The Process sub-menu activity is used to perform the actual RVP calculation once the size, target luminance, background luminance, and age information have been specified. This information is specified by using the Frame (section 3.3), Target (section 3.4.1.1), Background (section 3.4.1.2), and Age (section 3.4.1.3) activities, respectively. Upon selection of the Process activity a window flashes to the screen with the following message:

Processing . . .
This informs the user that the RVP calculations are being performed. When the calculation is complete, a window appears containing information as shown in the following example:

| | |
|---|---|
| Task luminance (cd/m^2) | 90.89 |
| Background luminance (cd/m^2) | 135.30 |
| Adaptation Luminance (cd/m^2) | 155.71 |
| Observer age (years) | 20 |
| Contrast | 0.328 |
| Solid angle (x10-3 sr) | 0.0120 |
| Relative visual performance | 0.879 |

This displays the results of the RVP calculation and the independent variables obtained from the user and the image. If in the process of calculation the software encounters a variable that has not been specified or that is out of range due to the limits of the RVP model, a warning message would occupy this window instead. The software will warn the user of the problem and informs the user of an assumed value which will be used to complete the calculation. The system software provides easy access to any activity for variable modification.

3.4.2 Luminance

The Luminance sub-menu activity permits the user to scan the image with a cursor to view the luminance of any pixel (section 3.4). Once the Luminance activity is selected the user is branched to a window which contains information as shown in the following example:

$x = 245$ $y = 115$
Luminance = 16.14

A cursor is placed at the center of the image, and the global coordinates and luminance are displayed in the window The arrow cursor keys are used to move the cursor on the video monitor Striking the <ESC> key will terminate this process.

3.4.3 Contour

The Contour sub-menu activity permits the user to reduce the number of luminance steps within the framed portion of the image. The image which is viewed on the video monitor can only be resolved into 256 grey levels. However, due to the use of the Long activity, a scene may be captured which has a maximum to minimum luminance ratio much greater than 256 to 1. Pixel values which are displayed as the same grey level may, in fact, have different luminances. This situation can be observed using the Luminance activity (section 3.4.2) to compare pixels. If a precise luminance is not necessary, the number of luminance steps can be reduced by the Contour activity. This can be helpful as a process for converging luminances that are close to the same value. Performing a contour of 256 would be the equivalent of capturing an image by using one aperture setting. Upon selection of the Contour activity the user is branched to a menu containing the following instructions:

| | |
|---|---|
| | 256 |
| Select the number of contours. | 128 |
| | 64 |
| | 32 |
| | 16 |
| | 8 |
| | 4 |
| | 2 |
| | 1 |
| | CLR |

This informs the user to select the desirable number of contour levels for the image. The user selects a contour level by using the arrow cursor keys and then pressing the [Enter] key. Selecting CLR causes the image to return to the original state with no contours. After selecting a contour value, the image inside the box is contoured, and the user is branched back to the previous sub-menu.

3.5 Exit

The Exit main menu item permits the user to terminate the CapCalc session. It should be noted that any unsaved image file will be lost. There are no sub-menu activities associated to this activity, so upon selection, the user will simply be returned to DOS.

4.0 A Step by Step Example

This Chapter takes the user through an example of the CapCalc system. Although there are many interior and exterior applications for the system, the following example has been chosen to demonstrate how task, background, size, and age influence Relative Visual Performance. This example will facilitate learning the system. This example assumes the user has performed the installation procedures discussed in Chapter 2.

The user should always turn on the system and let it warm up for one hour prior to image acquisition. Turning on the system means turning on the computer and making sure that the camera is plugged. If the green LED located at the back of the camera is illuminated then the camera is on. The Long and Short activities are used within the system software to perform image and luminance information acquisition. The warm-up time of the system is necessary to stabilize the electronic noise. For more details regarding the operating specifications of the camera refer to the technical material in Appendix A.

While the system is warming up place a suitable task in the camera's field of view. For example, place the report by Wright and Rea (1984) on the floor and position it so that the bar-leaf logo in the upper left hand corner of the document is in the centre of the camera field. The camera should be placed on a tripod no closer than one meter from the task. The camera will be aimed and focused on the task and one meter is the closest distance for doing so.

After the system is warmed up the software is ready to be initiated. This is done by first changing directories to that which contains the system software. To do this type CD C:CAPCALC after the system prompt <C:>. Once this is done, type CAP-CALC to begin the session. The software will load, execute, and display on the monitor a window with the following software title and information:

```
            VISIBILITY METER
        National Research Council Canada
            Montreal Road, Bldg M-24
                Version 1.00
           Copyright © NRC/IRC 1987.
                All rights reserved.
```

After reading the above hit Enter to continue to a window containing the following main menu:

| Acquire | File | Frame | Calculate | Exit |

The next step is to acquire the image and luminance information. To acquire an image select the Acquire item by using the arrow cursor keys and hitting [Enter]. This will branch control to the sub-menu of activities as shown which permit the acquisition of an image:

Long
Short
Refresh
· Number
Clear
Zeroing

The scene in which we are interested is that of the supplied task placed on the floor. However, two steps must be performed prior to acquiring an image of this scene. Step one is the selection of the number of images to be averaged by using the Number submenu activity. Use the arrow cursor and Enter key to do this. The following instruction is displayed in a window:

| | |
|---|---|
| | 1 |
| Select number of images to be averaged | 2 |
| | 4 |
| | 8 |
| | 16 |
| | 32 |

Select the value 8 by using the cursor arrow keys and hitting [Enter]. Step two is the acquisition of a dark image by using the Zeroing sub-menu activity. Use the arrow cursor keys and [Enter] key to do this. The following instruction are displayed in a window:

Place lens cap on camera.
Acquire the dark image by hitting any key. This will take approximately 90 seconds. This image will be used to adjust for the dark, or zero, level of all images acquired by using the Long and Short activities Now that these two steps are complete the image of interest can be acquired Acquire the image by selecting the Short sub menu activity. The differences between choosing the Long or Short activity are described in more detail in Chapter 3. The following instructions will appear in a window:

Select image of interest.
At this time the camera image is displayed on the video monitor. The camera should be aimed and zoomed such that the paper containing the sample task just fills the entire screen of the video monitor Three steps must be accomplished to achieve a proper image of the scene. Firstly, the zoom setting should be such that one of the lines associated with the focal lengths of 12.5, 15, 20, 30, 50, or 75 is aligned with the stationary line on the barrel of the lens. Secondly, the aperture should be set such that one of the aperture numbers 1.8, 2, 2.8, 4, 5.6, 8, 11, 16, or 22 lines up with the stationary line on the barrel of the lens. The detents help lock the setting on an appropriate position. The aperture setting should be at a position where the image does not go completely black or completely white. Thirdly, a crisp image is achieved by properly focusing the camera. Once these steps are completed the information concerning zoom (focal length) and aperture setting must be entered into the software. By hitting the Enter key, CapCalc asks for the zoom lens focal length in a window containing the following instruction:

| | |
|---|---|
| | 12.5 |
| Select zoom setting from lens | 15.0 |
| | 20.0 |
| | 30.0 |
| | 50.0 |
| | 75.0 |

Once again use the cursor and [Enter] keys to select the correct value. The value selected should correspond to the focal length setting on the camera lens. Upon selection CapCalc asks for the lens aperture setting in a window containing the following instructions:

| |
|---|
| 1.8 |

| Select aperture setting from lens. | 2.0 |
| --- | --- |
| | 2.8 |
| | 4.0 |
| | 5.6 |
| | 8.0 |
| | 11.0 |
| | 16.0 |

Once again, the value selected should correspond to the aperture setting on the camera lens. Upon selection of the appropriate value the system will begin the image acquisition process. The following message will appear in a window on the screen:

Processing . . .

This warns the user that eight images are being acquired and averaged. This process will take approximately 90 seconds. It is critical that the camera and scene remain stationary while this message is on the screen. When this message disappears from the screen, the image has been successfully acquired.

The image can now be saved to disk by using the File main menu item. To return to the main menu hit the Esc key. For security, and in the event of a power failure, the image should be saved immediately. Select the File main menu item by using the arrow cursor and Enter keys. The following list of sub-menu activities will appear in a window:

Save
Read
Erase
Path

Select the Save sub-menu activity by using the cursor arrow keys and hitting Enter. The following instruction will appear in a window:

| Enter File Name: | .VMI |
| --- | --- |

An appropriate file name should be entered into the input field provided. Up to eight alpha-numeric characters can be used in this file name. The image luminance will be saved to disk under this file name. It is recommended that the file name EXAMPLE be typed in. Once the name has been typed in and the Enter key hit, the status line at the bottom of the screen will read the following:

| Current file : EXAMPLE . VMI | Current path : C: CAPCALC |
| --- | --- |

This line is helpful for keeping track of what image file is displayed on the video monitor and in what directory it is saved on disk. It should be mentioned that the current path status is always to the directory from which the system software was initiated unless changed by use of the Path activity.

To verify that the Save activity behaved correctly the Read activity can be used. Upon selection of the Read activity a window will appear with an alphabetically ordered listing of the image and luminance information files in the current directory. If no other image or luminance information has been previously saved, and the Save activity behaved properly, the window will contain the following name:

EXAMPLE

Any image file in this window can be retrieved by using the arrow cursor keys and hitting [Enter]. Since we do not want to read in the image, hit Esc to return to the previous sub-menu.

Now that the image has been acquired and saved to disk, the next step is to perform an RVP analysis. However, to perform an RVP analysis, an area of interest must be determined within the image. The area of interest contains the visual target and the immediately surrounding background. This area is defined by using the Frame main menu item. Once again, hit Esc to return to the main menu and select the Frame main menu item by using the arrow cursor keys and hit [Enter].

Upon selection of the Frame main menu item a window will appear with the following sub-menu activities:

Locate
Expand
Reduce
Hide
Magnify

The first three activities (Locate, Expand, and Reduce) are used to position a rectangular frame around the area of interest. The forth activity (Hide) is used to remove the frame from the image, and the last (Magnify) to enlarge the area of interest. Some of these activities will be used to locate the frame around the barleaf logo target on the Wright-Rea document.

First, select the Locate activity. A window will appear on the screen with the following message:

Move frame with cursor keys.

Use the cursor arrow keys to locate the rectangular frame around the black bar target. The cursor arrow keys perform a coarse movement for the frame, moving it in steps of 5 pixels each time a cursor key is struck. For fine movement of one pixel steps, the Shift key is held down with simultaneous use of the cursor keys. Once satisfied with the location hit the Esc key to return to the previous sub-menu activity. Second, use either the Expand or Reduce activity to surround the target such that the frame just encloses it and a small part of the background. Once again, use of the Shift keys permit fine movement of the edges of the frame. Third, now that the area of interest has been defined, the Magnify activity is selected to make it easier to see. Return to the previous sub-menu by hitting Esc, and select the Magnify activity. A window appears on the screen with the following message:

Magnification Factor (1-10): 1

Type a number between 2 and 10 over the number 1 which resides in the input field, then hit [Enter]. Notice that the image area including the frame has been scaled to a larger size by the factor specified. This permits a better look at the visual details within the frame without affecting the target size in memory used in later RVP calculations. The original size can be obtained by selecting the Magnify activity again and specifying a factor of 1. For the example leave the framed area magnified To perform the RVP calculations, return to the main menu by hitting Esc and select the Calculate main menu item. A window will appear on the screen with the following sub-menu of activities:

RVP
Luminance

Contour

As seen in this sub-menu one of the available activities is RVP. This activity will be used momentarily, but first, some time should be spent investigating the Luminance and Contour activities.

Select the Luminance activity. This activity permits the scanning of the image to observe the pixel luminances that make up the image. Upon selection a window appears on the screen with luminance and pixel location information. The location is determined by the cursor displayed on the image. The global coordinate origin is at the top-left corner of the screen. The x-axis is horizontal, and the y-axis is vertical. The following is an example of this information:

$x = 267\ y = 200$
Luminance = 101.15

Use the arrow cursor keys to move the cursor around within the framed area. Notice how there are slight variations in luminance from pixel to pixel on the target and the background. Once again the Shift key can be used to fine cursor movements. For purposes of calculating RVP the user must specify which of the pixels within the frame are task, and which are background. This can become very tedious if many luminances (pixels) need to be selected. Under many circumstances, individual pixel selection is too precise, especially if the variation between luminances is small. For this reason the Contour activity is available to converge luminances of similar values. Observe this contouring process by hitting Esc to return to the previous sub-menu and selecting Contour.

Upon selection of Contour a window will appear with the following:

|  |  |
|---|---|
| Select the number of contours. | 256 |
|  | 128 |
|  | 64 |
|  | 32 |
|  | 16 |
|  | 8 |
|  | 4 |
|  | 1 |
|  | CLR |

Select 8 by using the cursor arrow keys and hitting [Enter]. Pay attention to what happens to the image area within the frame on the video display. The resolution of luminances within this area has been decreased to 8 steps. The system software has done this by finding the range of maximum to minimum luminance within the frame dividing it into 8 equally spaced steps, and finding the pixel weighted average luminance within each step. The new luminances are then displayed. This process can be thought of as converging the luminances of a higher resolution to a specified lower level of precision. Repeat this process at various contour levels to observe this behaviour. Once satisfied with a level of contours select the RVP sub-menu activity.

Upon selection of the RVP sub-menu activity another window will appear with yet another list of sub-menu activities as follows:

Target
Background
Age
Process

The first three activities (Target, Background, Age) allow for the input of information necessary to perform the RVP calculations. The last activity (Process) is selected to perform the calculations based on the information input during the first three activities and display the results. To start, select the Target sub-menu activity.

Upon selection of the Target sub-menu activity a window appears on the screen with instructions on how to select the area within the frame which you want to consider as the target. The following is an example of such instructions:

Locate cursor on target and hit <Enter>
$x = 327\ y = 206$ Luminance = 19.69

Use the cursor arrow keys to position the cursor within the frame and select those pixels which you wish to consider as the target. Upon selection, of a this pixel and all other pixels of the same luminance are displayed as black to signify that they are also considered as part of the task. This is done so to avoid the tedious process of selecting each pixel which comprises the task. The Contour activity also expedites this process. Notice that you can select as many luminances as necessary to define which area of pixels determines the task. For purposes of calculation, a single task luminance is generated by performing a pixel weighted average over all those pixels which were selected. The process of terminating luminance selection for the target is done by hitting <ESC>. It is the sum of all of the pixels which turned black that determines the area of the target. Each time the Target activity is selected the process starts from the beginning, so that at any time the user can get a fresh start.

The Background sub-menu activity is selected next. This process is very similar to that for the Target sub-menu activity. Upon selection of this activity similar instructions will occur, however, this time the selected pixels determine the background within the framed area. Notice that when pixels are displayed in white. Once again, the same process for calculating a pixel weighted average is performed for the background and it is terminated by hitting <ESC>.

The Age sub-menu activity is selected once the user is satisfied with the target and background input information. Upon selection of this sub-menu activity a window appears on the screen with the following prompt:

Age (20–65): 20

This age is used in performing the RVP calculation. The 20 which is displayed can be used or the user can modified the age by typing in a number from 21 to 65 and hitting [Enter]. For the time being, leave the age as displayed at 20. The consequences of age on RVP can be investigated later.

The information necessary to perform the RVP calculation has now been input. The Process sub-menu activity should now be selected. Upon selection of this sub-menu activity the information which is used for the calculations is checked to see if it is within certain boundary conditions. These boundary conditions are those which are intrinsic to the model upon which the calculations are based. If any information is outside these boundaries, a window appears with a warning message describing which information is beyond a limit and what value will be used in the calculations instead. The RVP calculations are then performed and the results are displayed in a window as shown in the following example:

| | |
|---|---|
| Target luminance (cd/m^2) | 23.61 |
| Background luminance (cd/m^2) | 98.46 |
| Adaptation luminance (cd/m^2) | 81.95 |
| Observer age (years) | 20 |
| Contrast | 0.760 |
| Solid angle (x10-3 sr) | 0.0115 |
| Relative visual performance | 0.931 |

To obtain a better understanding of RVP and the results of these calculations, the user is encouraged to read the literature referenced in Appendix B.

This completes the example of the use of the CapCalc system to perform an RVP calculation. It is recommended that the user continue the session to become more familiar with the influences of age, size, and target and background luminance on RVP.

This example should not be used as a substitute for the manual. The details provided throughout this manual permit a better understanding of the CapCalc system and its use.

APPENDIX A

MiCrosoft GW-BASIC User's Guide and User's Reference
Microsoft MS-DOS User's Guide and User's Reference
Panasonic WV-5410 Operating Instructions
PCVISIONplus Frame Grabber User's Manual
Roland Printer PR-1212A Operating Instructions
I/O PLUS III User's Manual
Multi-Compatible Keyboard User's Manual
Roland DG Character Display Owner's Manual
TC100 and TC100x series cameras Installation and Operating Instructions
Imaging Technology Incorporated Installation Note (87–01)
PCVISION Plus Toolbox 1.2 Customer Release Notes

APPENDIX B

Age, A Human Factor in Lighting, by G. A. Wright & M. S. Rea, Proceedings of the 1984 International Conference on Occupational Ergonomics, Toronto, Ont. May 7–9, 1984, Vol. 1, Research Reports and Case Studies, pp. 508–512.

Visual Performance Using Reaction-Times, by M. S. Rea and M. J. Ouellette, prepared for the National Lighting Conference, Cambridge, U.K., 1988, in press.

Practical Implications of a New Visual Performance Model, by M. S. Rea, Lighting Research and Technology, Vol. 18, No. 3, 1986.

I claim:

1. A photometric device, comprising;
   (a) a video camera having a pixel sensor array and known pixel value output signals, relative to a black reference zero light value storage element in the sense, array, in response to the spatial—light intensity information being viewed by the camera, the camera having a low geometric distortion,
   (b) filter means on the variable aperture lens for, in operation, transforming the camera spectral sensitivity to match a known spectral sensitivity,
   (c) an image acquisition board connected to the output from the camera and having a spatial resolution closely related to that of the camera, the board having a dc restoration circuit for correcting any drift in the camera output signal, a pixel value programmable gain and offset amplifier, and means for storing the pixel values in digital form in a frame memory spatial array.
   (d) a video target viewer connected to the camera, and
   (e) means connected to the output of the image acquisition board for computing visual angle and scaling the pixel output signals for computing contrast from the absolute value in relation to a predetermined light intensity received by the camera, and providing a substantially constant and linear relationship capability between the light input and pixel value output signals over substantially the entire pixel sense array and the light range of operation.

2. A device according to claim 1, wherein the video camera has a variable aperture lens, and the predetermined light intensity received by the camera is determined by the setting of the variable aperture lens.

3. A device according to claim 1, wherein the filter means is a V-lambda' filter for, in operation, producing a photopic response by the device.

4. A device according to claim 1, wherein the filter means is a V-lambda' filter for, in operation, producing a scotopic response by the device.

5. A device according to claim 1, wherein the filter means is one of a plurality of different filter means for, in operation, being used sequentially to filter different wavelengths, and the means connected to the output of the image acquisition board is for, in operation, deducing colour information from the filtered wavelengths.

* * * * *